US009473201B2

(12) United States Patent
Morton et al.

(10) Patent No.: US 9,473,201 B2
(45) Date of Patent: Oct. 18, 2016

(54) FREQUENCY CONVERSION SYSTEM WITH IMPROVED SPURIOUS RESPONSE AND FREQUENCY AGILITY

(71) Applicant: RAYTHEON COMPANY, Waltham, MA (US)

(72) Inventors: Matthew A. Morton, Tewksbury, MA (US); Tina P. Srivastava, Tewksbury, MA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/560,834

(22) Filed: Dec. 4, 2014

(65) Prior Publication Data

US 2016/0164569 A1 Jun. 9, 2016

(51) Int. Cl.
| | | |
|---|---|---|
| *H04K 1/02* | (2006.01) | |
| *H04L 25/03* | (2006.01) | |
| *H04L 25/49* | (2006.01) | |
| *H04B 1/68* | (2006.01) | |
| *H04B 15/04* | (2006.01) | |

(52) U.S. Cl.
CPC .............. *H04B 1/68* (2013.01); *H04B 15/04* (2013.01)

(58) Field of Classification Search
CPC ....... H03D 7/18; H01F 27/34; H01F 10/245; H03H 2/001
See application file for complete search history.

(56) References Cited

U.S. PATENT DOCUMENTS

| 4,283,692 A | 8/1981 | Adam | |
|---|---|---|---|
| 5,307,516 A * | 4/1994 | Nomoto | ................. H03H 2/001 333/148 |
| 5,483,161 A * | 1/1996 | Deeter | ............... G01R 33/0322 250/225 |
| 5,523,725 A | 6/1996 | Ishikawa et al. | |
| 5,785,752 A * | 7/1998 | Tanno | ..................... C30B 19/02 117/30 |
| 5,802,463 A * | 9/1998 | Zuckerman | .............. H03D 3/00 455/208 |
| 5,831,439 A * | 11/1998 | Suenram | ................ G01N 22/00 324/633 |
| 5,923,228 A * | 7/1999 | Okada | .................... H03H 2/001 333/109 |
| 6,028,495 A * | 2/2000 | Umegaki | ............... H03H 2/001 333/148 |
| 6,111,911 A * | 8/2000 | Sanderford, Jr. | ...... H04B 1/707 375/141 |
| 6,584,304 B1 * | 6/2003 | Thomsen | ............... H04B 1/005 455/188.1 |
| 6,850,132 B2 | 2/2005 | Jun et al. | |
| 6,975,264 B2 | 12/2005 | Nendick | |

(Continued)

OTHER PUBLICATIONS

Bohn et al., "Closed-Loop Spurious Tone Reduction for Self-Healing Frequency Synthesizers," IEEE, 4 pages, 2011.

(Continued)

*Primary Examiner* — Shuwang Liu
*Assistant Examiner* — Sung Ahn
(74) *Attorney, Agent, or Firm* — Lewis Roca Rothgerber Christie LLP (57) ABSTRACT

A frequency conversion system with improved performance. In one embodiment an image reject mixer is used to perform frequency conversion providing an initial degree of suppression of the image and local oscillator leakage signals, and a signal to noise enhancer (SNE) is used to further suppress the image and local oscillator signals, the signal to noise enhancer being a nonlinear passive device that attenuates low-power signals while transmitting high power signals with little loss. The signal to noise enhancer may be fabricated as a thin film of yttrium iron garnet (YIG) epitaxially grown on a gadolinium gallium garnet (GGG) substrate, the GGG substrate secured to a microwave transmission line from the input to the output of the signal to noise enhancer, such that the thin film of yttrium iron garnet is close to the transmission line.

17 Claims, 6 Drawing Sheets

(56) References Cited

U.S. PATENT DOCUMENTS

| | | | | |
|---|---|---|---|---|
| 7,092,043 | B2* | 8/2006 | Vorenkamp | H01F 17/0006 257/E27.046 |
| 7,542,519 | B2 | 6/2009 | McCallister | |
| 7,693,491 | B2 | 4/2010 | Pan | |
| 8,461,901 | B1* | 6/2013 | Morton | H03D 7/1441 327/355 |
| 2003/0214363 | A1* | 11/2003 | Jun | H01P 5/10 333/25 |
| 2012/0194893 | A1* | 8/2012 | Maleki | G02F 2/02 359/246 |

OTHER PUBLICATIONS

Jeon et al., "A Scalable 6-to-18 GHz Concurrent Dual-Band Quad-Beam Phased-Array Receiver in CMOS," IEEE Journal of Solid-State Circuits, 43(12):2660-2673, Dec. 2008.

Wang et al., "A Tunable Concurrent 6-to-18GHz Phased-Array System in CMOS," IEEE, pp. 687-690, 2008.

Stitzer et al., "Magnetostatic Surface Wave Signal-To-Noise Enhancer," IEEE MTT-S- Digest, Westinghouse Electric Corp., pp. 238-240, 1980.

Adam, "A Broadband Microwave Signal to Noise Enhancer," IEEE Transactions on Magn., 16(5):1168-1170, Sep. 1980.

Kuki et al., "A Reflection Type of MSW Signal-To-Noise Enhancer in the 400-MHz Band," IEEE MTT-S Digest, pp. 111-114, 1995.

Nomoto et al., "A Signal-To-Noise Enhancer Using Two MSSW Filters and its Application to Noise Reduction in DBS Reception," IEEE Trans. on Microwave Theory and Tech., 41(8):1316-1322, Aug. 1993.

Saha et al., "A Tunable, SiGe X-band Image Reject Mixer," IEEE, pp. 196-199, 2010.

* cited by examiner

FREQUENCY CONVERSION SYSTEM WITH IMPROVED SPURIOUS RESPONSE AND FREQUENCY AGILITY

BACKGROUND

1. Field

One or more aspects of embodiments according to the present invention relate to frequency conversion, and more particularly to a system for suppressing an image signal and local oscillator leakage in a frequency conversion system.

2. Description of Related Art

Systems transmitting radio frequency (RF) or microwave signals are on occasion deployed sufficiently near each other that the potential exists for transmissions from a first system to interfere with the reception, in a second system, of signals transmitted by a third system, and intended for the second system. For example, the signal transmitted by the first system may be a single-sideband suppressed carrier signal or another signal that is formed by frequency conversion of a baseband or intermediate frequency signal by mixing with a local oscillator, to form a transmitted signal with a single, relatively narrow band, principal frequency component. Such a signal may, as a result of its formation, include undesired image frequency components or local oscillator leakage, which increase the potential for interference with other signals.

Thus, there is a need for a system for reducing image frequency components and local oscillator leakage.

SUMMARY

Aspects of embodiments of the present disclosure are directed toward a frequency conversion system with improved spurious performance, improved frequency agility, reduced control and calibration, enhanced performance, reduced strain on data converters in the transmit chain, and improved flexibility for the adoption of new waveforms with varying instantaneous bandwidth. In one embodiment an image reject mixer is used to perform frequency conversion providing an initial degree of suppression of the image and local oscillator leakage signals, and a signal to noise enhancer (SNE) is used to further suppress the image and local oscillator signals, the signal to noise enhancer being a nonlinear passive device that attenuates low-power signals while transmitting high power signals with little loss. The signal to noise enhancer may be fabricated as a thin film of yttrium iron garnet (YIG) epitaxially grown on a gadolinium gallium garnet (GGG) substrate, the GGG substrate secured to a microwave transmission line from the input to the output of the signal to noise enhancer, such that the thin film of yttrium iron garnet is close to the transmission line.

According to an embodiment of the present invention there is provided a system for frequency conversion, the system including: an image reject mixer, configured: to receive a local oscillator input signal and a modulation signal, and to produce a modulated output signal, including: a first modulation sideband signal, a local oscillator output signal, and a second modulation sideband signal, the power in the local oscillator output signal being at least 5 decibels (dB) less than the power in the first modulation sideband signal, and the power in the second modulation sideband signal being at least 5 dB less than the power in the first modulation sideband signal; and a signal-to-noise enhancer (SNE) having: an input connected to receive the modulated output signal from the image reject mixer; and an output, the SNE including: a microwave transmission line connected between the input and the output of the SNE; a magnetic component capable of supporting magnetostatic waves; the magnetic component secured in proximity to the microwave transmission line; one or more magnets secured in proximity to the magnetic component; the SNE having the characteristic of allowing a signal to propagate from the input of the SNE to the output of the SNE: with a first attenuation when the power of the signal at the input of the SNE is less than a first threshold, and with a second attenuation when the power of the signal at the input of the SNE is greater than a second threshold, the first attenuation exceeding the second attenuation by at least 5 dB.

In one embodiment, the magnetic component includes a thin film of yttrium iron garnet (YIG) on a gadolinium gallium garnet (GGG) substrate.

In one embodiment, the thin film of YIG is a single crystal of YIG, the GGG substrate is a single crystal of GGG, and the thin film of YIG is lattice-matched to the GGG substrate.

In one embodiment, a portion of the transmission line in proximity with the magnetic component follows a substantially straight path.

In one embodiment, the one or more magnets include two magnets, positioned and oriented with respect to the portion of the microwave transmission line so as to produce, in the magnetic component, a biasing magnetic field substantially parallel to the portion of the microwave transmission line.

In one embodiment, the system includes a first input, a second input, and an output; a second IF mixer including a first input, a second input, and an output; a first filter including an input and an output; and a second filter including an input and an output, the first input of the first IF mixer being connected to the input of the image reject mixer, the output of the first IF mixer being connected to the input of the first filter the first input of the second IF mixer being connected to the input of the image reject mixer, the output of the second IF mixer being connected to the input of the second filter, and the output of the first filter and the output of the second filter being connected to the output of the image reject mixer.

In one embodiment, a combiner is connected between the output of the first filter and the output of the image reject mixer, and the combiner is connected between the output of the second filter and output of the image reject mixer.

In one embodiment, the first filter is a polyphase filter and the second filter is a polyphase filter.

In one embodiment, the system includes: a first variable gain amplifier connected between the output of the first IF mixer and the input of the first filter, and a second variable gain amplifier connected between the output of the second IF mixer and the input of the second filter.

In one embodiment, the system includes: a third variable gain amplifier connected between the output of the first variable gain amplifier and the input of the first filter, and a fourth variable gain amplifier connected between the output of the second variable gain amplifier and the input of the second filter.

In one embodiment, the gain of the third variable gain amplifier is adjustable in increments of 1 decibel (dB) or less.

In one embodiment, the system includes: a first phase shifter including one or more inputs and an output; and a second phase shifter including one or more inputs and an output; the output of the first phase shifter being connected to the second input of the first mixer, and the output of the second phase shifter being connected to the second input of the second mixer.

In one embodiment, the system includes an input and an output and a second variable gain amplifier including an input and an output and a combiner including a first input, a second input and an output the in-phase input being connected to the input of the first variable gain amplifier, the quadrature input being connected to the input of the second variable gain amplifier, the output of the first variable gain amplifier being connected to the first input of the combiner, and the output of the second variable gain amplifier being connected to the second input of the combiner.

In one embodiment, each of the first and second variable gain amplifiers is a digitally controlled variable gain amplifier.

In one embodiment, each of the first phase shifter and the second phase shifter further includes a limiter connected to the output of the combiner and configured to regulate the amplitude of the output of the combiner to a constant amplitude.

In one embodiment, the system includes an amplifier connected between the output of the image reject mixer and the input of the SNE.

In one embodiment, the amplifier has a gain selected to provide an input power level greater than the second threshold at the input of the SNE.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a frequency conversion system with improved spurious response and frequency agility provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The wide availability of high speed data converters has enabled a significant increase in capability for telecommunications, radar, electronic warfare, and other such systems. With the ability to generate complex waveforms with up to several hundreds of megahertz (MHz) of instantaneous bandwidth, and the corresponding ability to digitize such waveforms, these new capabilities may be leveraged by using them in architectures that support frequency conversion between the high frequency of the radio frequency (RF) band of interest and the relatively low RF frequencies of the data converters. In such systems, a filter may be required at the output of a digital to analog converter (DAC) or at the input of an analog to digital converter (ADC) to select the appropriate Nyquist zone. Such a filter may attenuate signals in adjacent Nyquist zones, decreasing the out-of-band spurious signals associated with the data conversion process.

Filtering may also be required as part of the frequency conversion process, to attenuate spurious signals at the output of a mixer. For example, if a balanced mixer is used as an upconverter without a filter on the RF output, the local oscillator (LO) leakage signal may be attenuated but the image band may appear on the RF output at a power level similar to that of the desired signal. The rejection of the LO signal depends on the level of balance achieved in the design, and may be on the order of 30 decibels (dB). However, for either upper or lower sideband conversion, the image band may appear with either minimal attenuation or even at a higher power level than the desired converted frequency component. A filter may be used to attenuate the image band, but a costly, high-performance filter may be required if the image band is near in frequency to the desired signal, and a tunable filter may be required if the frequency of the desired signal may change during operation.

One related art approach for improving the rejection of the image band is the image reject mixer architecture. One embodiment includes two mixers fed with LO signals that are 90 degrees out of phase, and a 90 degree hybrid coupler on the output of the mixers. When the two mixer outputs are combined, the desired signal may add in phase while the image signal adds out of phase, providing attenuation of the image band. This may result in a significant reduction of power in the image band without the explicit use of a filter. Such architectures may achieve 40 dB of image cancellation through this approach over an operation bandwidth of an octave. Unlike solutions involving a filter, the image reject mixer architecture may provide this cancellation over a range of frequencies without requiring a filter with a tunable frequency response.

However, even with image reject mixer architectures, the image band, LO leakage, and other spurious content may need to be attenuated further to avoid unacceptable interference. The combination of an image reject mixer with a filter to further attenuate any image and LO leakage may provide a higher level of rejection, as both the filtering response and intrinsic image rejection combine. The use of a filter has several drawbacks, however. A sharp frequency cutoff may be difficult to achieve in a filter of a given physical size; to compensate for this limitation, the frequency plan may be devised such that the desired RF signal is kept in a region far in frequency from the LO frequency. This permits a lower order filtering response to be used to meet a specified LO leakage and image band power level, but places a burden on the data conversion components. Higher Nyquist zones may be used in these cases, which may result in lower DAC output power, degraded signal to noise ratio, and higher power dissipation. It may also be challenging to tune a filter to different frequencies of operation. Although in some applications the RF band of interest is narrow and fixed, there may be wideband commercial and military applications in which the RF band of interest may cover an octave or more. Operating an image-reject mixer with a filter in such an application would require a tunable filter capable of being tuned over a wide bandwidth. The cost, size, and control complexity of a filter with such capabilities may limit its practical applications. A problem related to this is the ability to tune the filter bandwidth, as some applications may be required to support instantaneous bandwidths that are widely variable.

Figure 1:
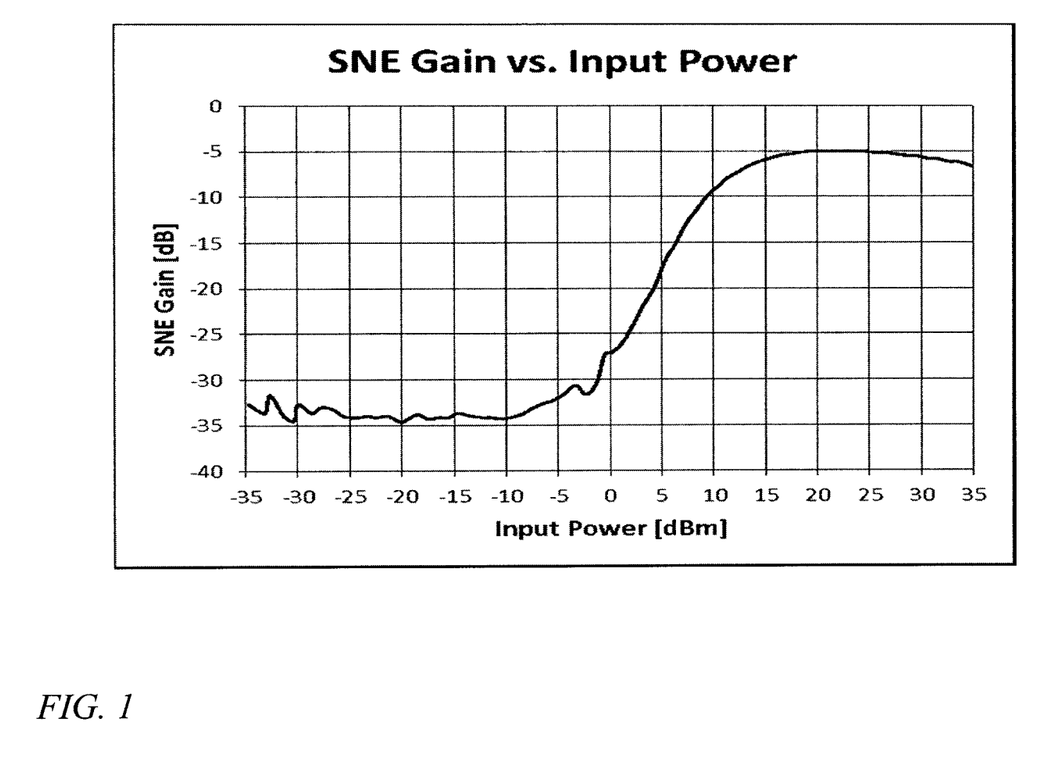
FIG. 1 is a graph of the gain of a signal to noise enhancer as a function of input power, according to an embodiment of the present invention.

The signal to noise enhancer (SNE) is a nonlinear passive device that attenuates signals below a first threshold power while passing signals above a second threshold power. FIG. 1 shows the gain of an SNE as a function of input power, when the input contains a single tone within the operating frequency range of the SNE. As the power is increased from −35 dBm to −9 dBm, the transmission loss remains greater than 32 dB (i.e., the gain remains less than −32 dB). As the power is increased above a first threshold power of −9 dBm, the loss decreases (i.e., the gain increases) to reach a loss of approximately 8 dB at a second threshold power of 12 dBm. Thus, the SNE provides high attenuation for signals with power below the first threshold power and low attenuation for signals with power above the second threshold power, the difference, in this example, being approximately 24 dB. The characteristics of an SNE may vary according to the details of its design, so that an SNE may exhibit, for example, less loss for a high-power tone, and the difference in attenuation between a high-power tone and a low-power tone (which also depends on how the first and second power thresholds are chosen) may be greater or less than the 24 dB of this example. In embodiments of the present invention, an SNE with a difference in attenuation (between a high power tone and a low power tone) of as little as 5 dB may provide useful performance benefits.

Figure 2:
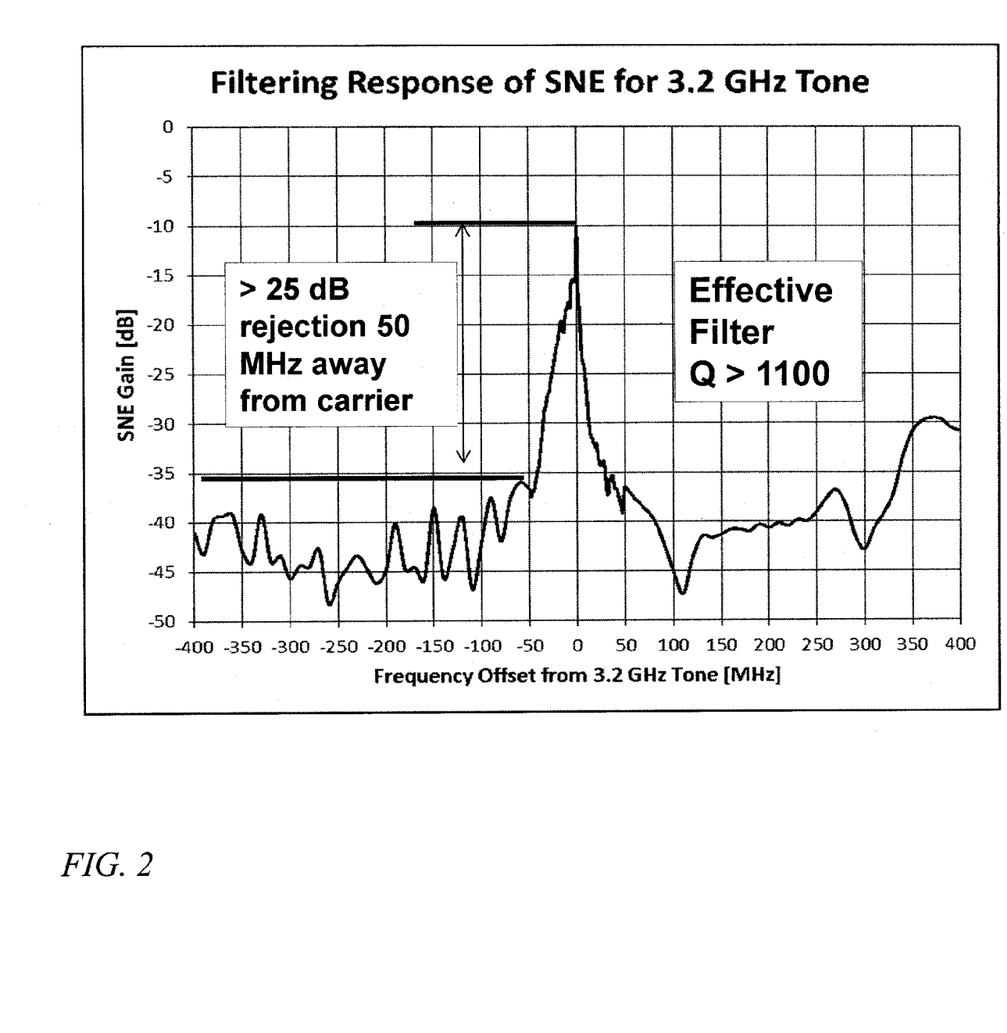
FIG. 2 is a graph of the gain of a signal to noise enhancer as a function of input frequency relative to the frequency of a principal tone, according to an embodiment of the present invention.

Referring to FIG. 2, a key feature of the SNE is the frequency selective nature of the high-power passband: low power signals close in frequency to the passed high-power signals are subject to high levels of attenuation. In particular, referring to FIG. 2, when the input signal includes a principal 12 dBm tone at 3.2 GHz and one or more weak signals at other frequencies, the principal tone is attenuated by 10 dB or less and signals at other frequencies that are 50 MHz or more from the principal tone are attenuated by at least 25 dB more than the amount by which the principal tone is attenuated. To achieve this level of attenuation 50 MHz from the center frequency of 3.2 GHz, a conventional linear filter would need a quality factor (Q) of over 1000. In this sense, the SNE acts as a high-Q (>1000) notch filter that automatically tunes to pass high power signals while rejecting low power signals in adjacent frequency bands.

The characteristic of FIG. 2 corresponds to a measurement in which a low-power test tone was swept in frequency over a first range of frequencies extending below the frequency of the principal tone, and over a second range of frequencies extending above the frequency of the principal tone. Measurements of the attenuation of a test tone very near in frequency to the principal tone are challenging because of the large amplitude difference between the test tone and the principal tone; the characteristic of FIG. 2 thus excludes measurements of the attenuation (expected to be less than the minimum 10 dB attenuation shown) over a small frequency interval including the principal tone.

Figure 3:
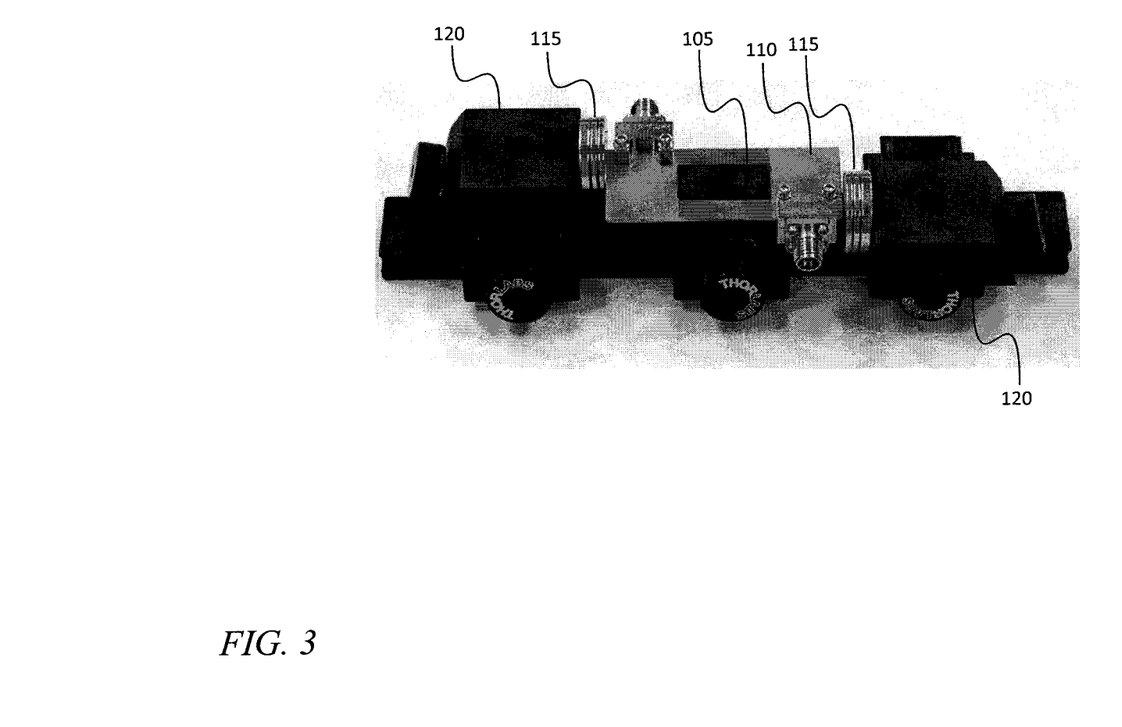
FIG. 3 is a photograph of a signal to noise enhancer, according to an embodiment of the present invention.

In one embodiment, the SNE is built according to the disclosure in U.S. Pat. No. 4,283,692 (the "'692 patent"), which is incorporated herein by reference in its entirety. FIG. 3 is a photograph of a prototype SNE. A thin film of yttrium iron garnet (YIG) epitaxially grown on a gadolinium gallium garnet (GGG) substrate 105 is secured, with the thin film side down, on or immediately above a straight portion of a microstrip transmission line fabricated on a surface of a dielectric substrate 110. A DC bias magnetic field is applied to the YIG sample in a direction parallel to the straight portion of the microstrip transmission line by two magnets 115. Each magnet may be a permanent magnet, as shown in FIG. 3, or it may be any other variety of magnet, such as an electromagnet. The thin film of YIG and the GGG substrate may each be a single crystal, and the thin film of YIG may be lattice-matched to the GGG substrate. In the prototype SNE of FIG. 3 the positions of the magnets are adjustable using translation stages 120; in a production unit the magnets may be installed in fixed positions identified, using the prototype, by adjusting the magnet positions in the prototype for acceptable performance. In other embodiments a single magnet may be used instead of a pair of magnets, or more than two magnets may be used.

In one embodiment, the propagation of electromagnetic signals along the transmission line excites magnetostatic waves (MSW) in the YIG film of the SNE; the MSW are long wavelength spin waves which may propagate at microwave frequencies in ferromagnetic materials placed within a biasing magnetic field. Microwave energy is coupled from the transmission line to MSW that propagate away from the transmission line. In order to prevent the MSW from reflecting from the edge of the film and interfering with the signal propagating along the transmission line, the edge of the film may be ground at an angle, e.g., forming a bevel on the lower edges of the GGG substrate and YIG film, or the GGG substrate may be formed as a curved surface (e.g., the GGG substrate and YIG film may be in the shape of a circular disk). In other embodiments the MSW may be attenuated using a conductive material, such as a 0.6 nm layer of aluminum, deposited onto the surface of the microstrip dielectric substrate, sufficiently far from the transmission line to avoid significantly affecting modes propagating in the transmission line.

The coupling of energy from waves travelling in the microstrip transmission line into magnetostatic surface waves may be increased by depositing a metal (e.g., gold) film on the YIG film in a pattern forming a slot parallel to the microstrip transmission line, or a coplanar structure with a central conductor parallel to the microstrip transmission line, between two coplanar ground planes.

In operation, magnetostatic surface waves are launched and propagated in the YIG film in response to an input signal applied to the microstrip transmission line. Magnetostatic volume waves are also possible with different directions of the magnetizing field relative to the YIG film, as is well known to those skilled in the art. Magnetostatic surface waves and magnetostatic volume waves are collectively referred to herein as magnetostatic waves (MSW). The launching of a magnetostatic wave removes power from the transmission line such that the output signal at the output of the SNE is attenuated relative to the input signal at the input of the SNE.

Due to the nonlinear nature of the MSW excitation and propagation, the amount of energy that can be coupled from the transmission line to MSW is limited. Therefore, above a certain power level of the exciting signal, saturation occurs and no additional power can be coupled to MSW. As a result, for low signal power levels, the microwave energy is coupled from the transmission line to MSW. In contrast, for high signal power levels, the coupling to MSW saturates and the amount of loss imparted on the signal propagating from the input to the output of the SNE is reduced. This behavior gives rise to a significant enhancement of the signal-to-noise ratio when the noise power is less than the first threshold power of the SNE and the signal is a tone with power greater than the second threshold power of the SNE.

Figure 4:
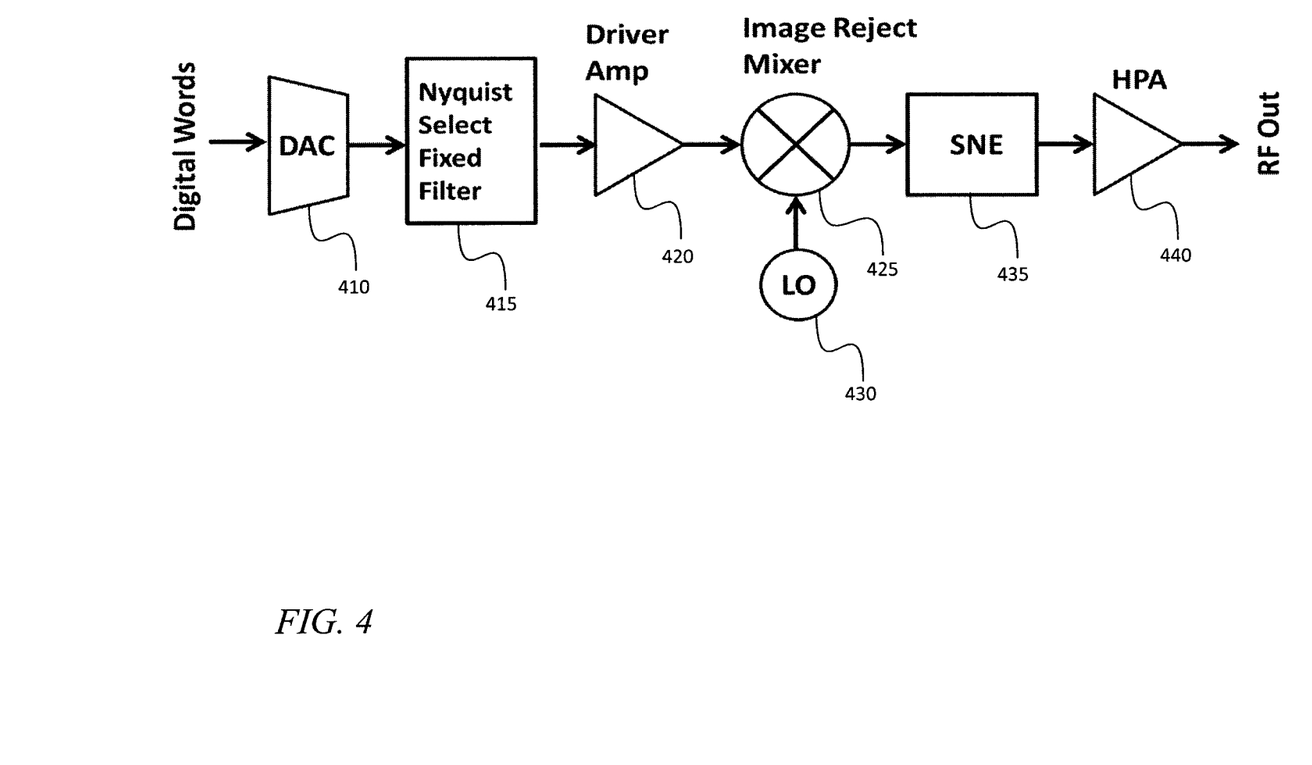
FIG. 4 is a schematic block diagram of a frequency converter according to an embodiment of the present invention.

Referring to FIG. 4, in one embodiment an image reject mixer and an SNE provide improved rejection of the LO leakage, image band, and other spurious content, in, for example, a transmitter application. In this embodiment, digital words are fed to a digital to analog converter (DAC) 410, a Nyquist filter 415, which may be a fixed filter, selects a desired Nyquist zone, a driver amplifier 420 amplifies the signal at the output of the Nyquist filter 415, an image reject mixer 425 mixes the output of the amplifier with the signal from a local oscillator 430, providing an initial degree of suppression of the image and of the local oscillator signal, and an SNE 435 provides further suppression of the image and LO leakage signals. The signal at the output of the SNE 435 is then amplified by an amplifier 440 which may for example be a high power amplifier driving an antenna. In addition to providing suppression of the image and LO leakage signals, because of its auto-tuning nature and its ability to form appropriate filter responses to input stimulus, the SNE may be able to perform effectively in wideband upconversion systems.

In one embodiment, the Nyquist filter 415 restricts the DAC 410 to output frequencies only within the intended operating band of the DAC 410, and the driver amplifier 420 provides sufficient gain to keep the desired signal at the output of the mixer within the design input power range of the SNE 435, which may be 15-25 dBm, although in some embodiments an SNE may have a design input power range with a significantly higher upper limit. The image reject mixer has sufficiently low loss and high linearity to keep the desired signal above the second threshold power of the SNE, but also has sufficient rejection of the LO and image content to keep the power levels of these signals below the first threshold power level of the SNE. In this arrangement, the desired signal content is passed by the SNE, and all other signals from the mixer are further attenuated by the SNE.

Because the nonlinear behavior of the SNE is frequency selective, and because the image reject mixer has attenuated the spurious content below the first threshold power of the SNE, the resulting instantaneous filter profile may be similar to that of a bandpass filter with a very high quality factor (Q), e.g., Q>1,000.

Figure 5A:
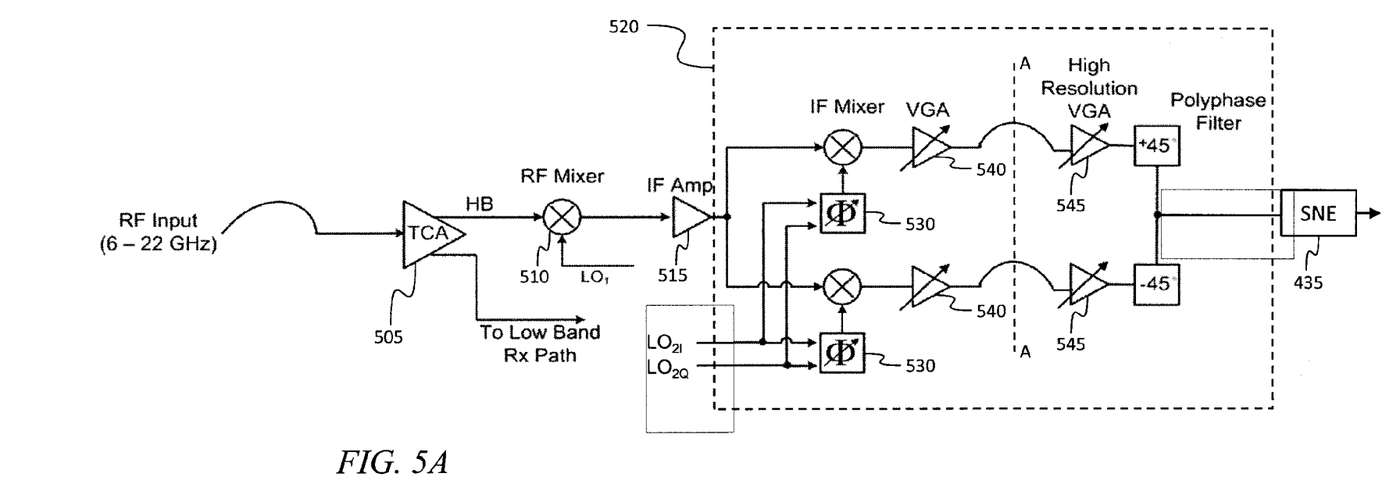
FIG. 5A is a schematic block diagram of a frequency converter according to another embodiment of the present invention.

Referring to FIG. 5A, an image reject mixer and an SNE may be used, in one embodiment, in a receiver. A signal extending, for example from 6 to 22 GHz is received at an RF input, and is amplified by a tunable concurrent amplifier (TCA) 505, which is a low-noise amplifier with two outputs, each covering a different frequency band, in one embodiment 6 to 12 GHz for the low band and 12 to 22 GHz for the high band. The high band output of the TCA 505 is connected to a first mixer 510 that mixes the high band RF down using a first local oscillator signal LO$_1$ to a significantly lower frequency, e.g., mixing an input at 21 GHz down to 7 GHz. The large frequency change effected by the first mixer may cause both any LO leakage and any image signal to be well out of band for the subsequent stages and therefore of little consequence. The output of the first mixer 510 is amplified by a buffer intermediate frequency (IF) amplifier 515 and then shifted in frequency by an image reject mixer 520, which, in the embodiment of FIG. 5A, is a Hartley image reject mixer.

The first stage of the image reject mixer 520 contains, for the two paths, two respective IF mixers, which may be double-balanced mixers, and two phase shifters 530, each driving the LO input of a respective one of the two mixers. The two phase shifters 530 are adjusted to provide, to their respective mixers, LO signals differing in phase by 90 degrees. The output of each of the two mixers is amplified by one or more respective variable gain amplifiers (VGAs) 540, 545 and filtered by a respective filter, which may be a polyphase filter. The filters are selected so that the phase change imposed by the two filters differs by 90 degrees, as, for example, if one filter applies a phase lead of 45 degrees and the other applies a phase lag of 45 degrees. The outputs of the two filters may be connected to the output of the image reject mixer. For example, each of the filters may be connected to an input of a combiner with two inputs and one output, and the output of the combiner may be connected to the output of the image reject mixer.

Figure 5B:
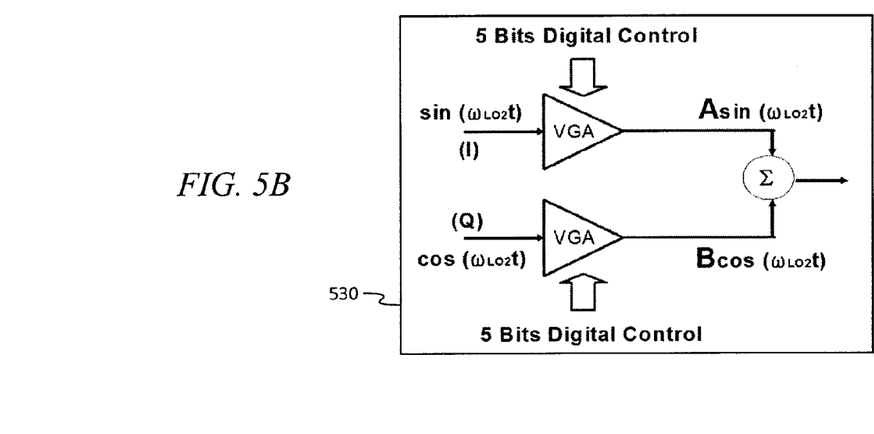
FIG. 5B is a schematic block diagram of a phase shifter employed in a frequency converter in the embodiment of FIG. 5A.

Each of the phase shifters 530 may be a vector modulator. Referring to FIG. 5B, in one embodiment, a vector modulator is implemented as two variable gain amplifiers, one amplifying an in-phase local oscillator signal and one amplifying a quadrature local oscillator signal, a combiner that combines (e.g., sums) the outputs of the two variable gain amplifiers, and a limiter (not shown) that regulates the amplitude of the output of the combiner to a constant amplitude, to form the output of the vector modulator. By forming an arbitrary linear combination of the in-phase local oscillator signal and the quadrature local oscillator signal, the vector modulator is able to generate an output signal with arbitrary phase. In one embodiment, each of the variable gain amplifiers has a digitally controlled gain with 5 bits of resolution, and the vector modulator is able to provide an output with a phase adjustable in increments of approximately 1 degree.

In one embodiment, two variable gain amplifiers 540, 545 follow each IF mixer, including a coarse variable gain amplifier 540 and a fine variable gain amplifier 545. The coarse variable gain amplifier 545 may have a large, e.g., 30 dB, range of gain adjustment. The fine variable gain amplifier 545 may have a smaller range of gain adjustment and be adjustable in finer increments, e.g., in increments of 0.1 dB. In one embodiment, the settings of the vector modulators and of the variable gain amplifiers 540, 545 may be adjusted to optimize the suppression of the image signal at the output of the image reject mixer; cancellation (i.e., rejection) of 40 dB may be achievable.

Figure 6:
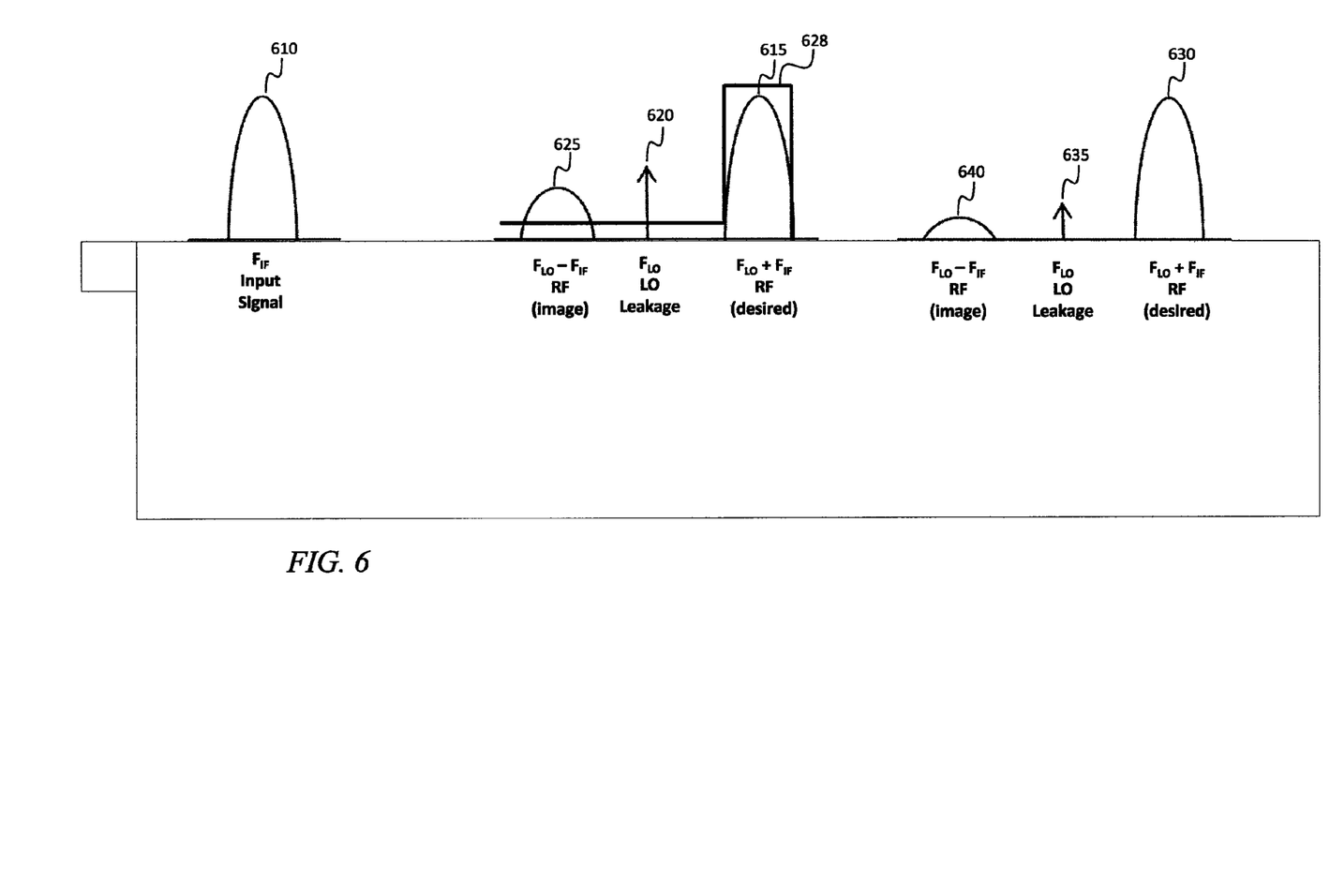
FIG. 6 is a sequence of spectra showing the effects of frequency conversion and signal to noise enhancement according to an embodiment of the present invention.

As in the embodiment of FIG. 4, in the embodiment of FIG. 5A, an SNE 435 may be connected to the output of the image reject mixer 520 to further improve the suppression of the undesired LO leakage and image signals. In one embodiment an amplifier (not shown) may be installed between the output of the image reject mixer 520 and the SNE 435 to provide a signal level, at the input of the SNE 435, that is within the design input power range of the SNE 435. Referring to FIG. 6, in one embodiment a first signal 610 at a first frequency $F_{IF}$ is converted, by an image reject mixer, to a second signal 615 at a second frequency $F_{LO}+F_{IF}$, with the resulting spectrum containing suppressed, but nonetheless significant, power at the LO frequency 620 and the image frequency 625. The output of the image reject mixer is connected to an SNE 435, which applies an effective transfer function 628, so that the output of the SNE 435 contains the desired signal 630, slightly attenuated by the SNE 435, and the signals 635, 640 at the LO frequency and at the image frequency that are more greatly attenuated by the SNE 435, with a resulting improvement in performance, e.g., a resulting reduction in interference.

Circuit elements to the left of the line A-A in FIG. 5A may be fabricated on one integrated circuit (IC), e.g., on a receiver on a chip (RoC) IC, and components to the right of the line A-A in FIG. 5A may be fabricated on another IC, e.g., a Hartley combining IC. The low band output of the TCA 505 may be processed by a circuit similar to that shown for the high band output of the TCA 505.

When used with an image reject mixer with 45 dB image and 30 dB LO rejection, embodiments of the present invention may achieve more than 70 dB of image rejection and more than 55 dB of LO rejection. Further, this rejection may be achievable over the full bandwidth of the SNE device, which may be an octave. Because the response of the SNE is formed automatically in response to the input signal stimulus, no tuning or other manipulation may be required to accommodate changes in RF frequency or changes in the instantaneous bandwidth of the signal.

Embodiments of the present invention provide a significant improvement in the spurious performance of frequency converting systems, automatically adapting to the instantaneous operating environment, requiring no input or control from the user, and no need for calibration. Because the desired RF band can be used in close proximity to the LO frequency and maintain the same spurious performance, lower order Nyquist zones can be used from the DAC, thereby decreasing data converter cost, increasing signal-to-noise ratio, and reducing power consumption.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the term "substantially," "about," and similar terms are used as terms of approximation and not as terms of degree, and are intended to account for the inherent deviations in measured or calculated values that would be recognized by those of ordinary skill in the art. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

It will be understood that when a first element or layer is referred to as being "on", "connected to", "coupled to", or "adjacent to" a second element or layer, the first element or layer may be directly on, connected to, coupled to, or adjacent to the second element or layer, or one or more intervening elements or layers may be present. In the case of a first element connected to a second element, an intervening element may be "connected between" the first element and the second element. In contrast, when an element or layer is referred to as being "directly on", "directly connected to", "directly coupled to", or "immediately adjacent to" another element or layer, there are no intervening elements or layers present.

Although limited embodiments of a frequency conversion system with improved spurious response and frequency agility have been specifically described and illustrated herein, many modifications and variations will be apparent to those skilled in the art. Accordingly, it is to be understood that a frequency conversion system with improved spurious response and frequency agility employed according to principles of this invention may be embodied other than as specifically described herein. The invention is also defined in the following claims, and equivalents thereof.

What is claimed is:

1. A system for frequency conversion, the system comprising:
   an image reject mixer, configured:
      to receive a local oscillator input signal and a modulation signal, and
      to produce a modulated output signal, comprising:
         a first modulation sideband signal,
         a local oscillator output signal, and
         a second modulation sideband signal,
      the power in the local oscillator output signal being at least 5 decibels (dB) less than the power in the first modulation sideband signal, and
      the power in the second modulation sideband signal being at least 5 dB less than the power in the first modulation sideband signal; and
   a signal-to-noise enhancer (SNE) having:
      an input connected to receive the modulated output signal from the image reject mixer; and
      an output,
      the SNE comprising:
         a microwave transmission line connected between the input and the output of the SNE;

a magnetic component capable of supporting magnetostatic waves, the magnetic component secured in proximity to the microwave transmission line;
one or more magnets secured in proximity to the magnetic component;
the SNE having the characteristic of allowing a signal to propagate from the input of the SNE to the output of the SNE:
with a first attenuation when the power of the signal at the input of the SNE is less than a first threshold, and
with a second attenuation when the power of the signal at the input of the SNE is greater than a second threshold,
the first attenuation exceeding the second attenuation by at least 5 dB.

2. The system of claim 1, wherein the magnetic component comprises a thin film of yttrium iron garnet (YIG) on a gadolinium gallium garnet (GGG) substrate.

3. The system of claim 2, wherein the thin film of YIG is a single crystal of YIG, the GGG substrate is a single crystal of GGG, and the thin film of YIG is lattice-matched to the GGG substrate.

4. The system of claim 1, wherein a portion of the transmission line in proximity with the magnetic component follows a substantially straight path.

5. The system of claim 4, wherein the one or more magnets comprise two magnets, positioned and oriented with respect to the portion of the microwave transmission line so as to produce, in the magnetic component, a biasing magnetic field substantially parallel to the portion of the microwave transmission line.

6. The system of claim 1, wherein the image reject mixer comprises:
a first intermediate frequency (IF) mixer comprising a first input, a second input, and an output;
a second IF mixer comprising a first input, a second input, and an output;
a first filter comprising an input and an output; and
a second filter comprising an input and an output,
the first input of the first IF mixer being connected to the input of the image reject mixer,
the output of the first IF mixer being connected to the input of the first filter
the first input of the second IF mixer being connected to the input of the image reject mixer,
the output of the second IF mixer being connected to the input of the second filter, and
the output of the first filter and the output of the second filter being connected to the output of the image reject mixer.

7. The system of claim 6, wherein a combiner is connected between the output of the first filter and the output of the image reject mixer, and the combiner is connected between the output of the second filter and output of the image reject mixer.

8. The system of claim 6, wherein the first filter is a polyphase filter and the second filter is a polyphase filter.

9. The system of claim 6, further comprising:
a first variable gain amplifier connected between the output of the first IF mixer and the input of the first filter, and
a second variable gain amplifier connected between the output of the second IF mixer and the input of the second filter.

10. The system of claim 9, further comprising:
a third variable gain amplifier connected between the output of the first variable gain amplifier and the input of the first filter, and
a fourth variable gain amplifier connected between the output of the second variable gain amplifier and the input of the second filter.

11. The system of claim 10, wherein the gain of the third variable gain amplifier is adjustable in increments of 1 decibel (dB) or less.

12. The system of claim 6, further comprising:
a first phase shifter comprising one or more inputs and an output; and
a second phase shifter comprising one or more inputs and an output;
the output of the first phase shifter being connected to the second input of the first mixer, and
the output of the second phase shifter being connected to the second input of the second mixer.

13. The system of claim 12, wherein each of the first phase shifter and the second phase shifter comprises:
an in-phase input;
a quadrature input;
a first variable gain amplifier comprising an input and an output;
a second variable gain amplifier comprising an input and an output; and
a combiner comprising a first input, a second input and an output,
the in-phase input being connected to the input of the first variable gain amplifier,
the quadrature input being connected to the input of the second variable gain amplifier,
the output of the first variable gain amplifier being connected to the first input of the combiner, and
the output of the second variable gain amplifier being connected to the second input of the combiner.

14. The system of claim 13, wherein each of the first and second variable gain amplifiers is a digitally controlled variable gain amplifier.

15. The system of claim 13, wherein each of the first phase shifter and the second phase shifter further comprises a limiter connected to the output of the combiner and configured to regulate the amplitude of the output of the combiner to a constant amplitude.

16. The system of claim 1, further comprising an amplifier connected between the output of the image reject mixer and the input of the SNE.

17. The system of claim 16, wherein the amplifier has a gain selected to provide an input power level greater than the second threshold at the input of the SNE.

* * * * *